(12) United States Patent
Pichler-Wilhelm et al.

(10) Patent No.: US 9,308,843 B2
(45) Date of Patent: Apr. 12, 2016

(54) ADJUSTMENT APPARATUS FOR A SWINGABLE COMFORT ELEMENT OF A MOTOR VEHICLE

(71) Applicant: Audi AG, Ingolstadt (DE)

(72) Inventors: Sonja Pichler-Wilhelm, Ingolstadt (DE); Stefan Deckert, Oedheim (DE); Hannes Rogl, Bad Friedrichshall (DE)

(73) Assignee: AUDI AG, Ingolstadt (DE)

( * ) Notice: Subject to any disclaimer, the term of this patent is extended or adjusted under 35 U.S.C. 154(b) by 202 days.

(21) Appl. No.: 13/974,528

(22) Filed: Aug. 23, 2013

(65) Prior Publication Data

US 2014/0054946 A1    Feb. 27, 2014

(30) Foreign Application Priority Data

Aug. 24, 2012 (DE) .......................... 10 2012 016 884

(51) Int. Cl.
*A47C 7/54* (2006.01)
*B60N 2/46* (2006.01)
*B60N 2/42* (2006.01)

(52) U.S. Cl.
CPC .. *B60N 2/46* (2013.01); *B60N 2/43* (2013.01); *B60N 2/4606* (2013.01); *B60N 2/466* (2013.01)

(58) Field of Classification Search
CPC .............. A47C 7/38; A47C 1/03; A61G 5/12; B60N 2/4606
USPC ........ 297/411.38, 411.35, 411.32, 411.3, 408
See application file for complete search history.

(56) References Cited

U.S. PATENT DOCUMENTS

| | | | | |
|---|---|---|---|---|
| 4,610,480 A | * | 9/1986 | Yamada | B60R 22/26 242/379.2 |
| 4,858,953 A | * | 8/1989 | Nishimura | B60R 22/06 180/268 |
| 4,969,686 A | * | 11/1990 | Germain | B60N 2/4606 297/113 |
| 5,370,333 A | * | 12/1994 | Lortz | B60R 22/35 242/384.1 |
| 5,425,568 A | * | 6/1995 | Sliney | B60N 2/22 297/359 |
| 5,743,593 A | * | 4/1998 | Vogt | B60N 2/3084 297/238 |
| 6,382,726 B2 | * | 5/2002 | Bullesbach et al. | ..... 297/411.38 |
| 6,652,032 B2 | * | 11/2003 | Laval | ...... 297/411.32 |
| 6,916,068 B2 | * | 7/2005 | Kitamura et al. | .......... 297/411.3 |
| 7,108,318 B2 | * | 9/2006 | Himmelhuber et al. | ...... 297/115 |
| 7,185,952 B1 | * | 3/2007 | Chen et al. | ............... 297/411.38 |
| 8,662,594 B2 | * | 3/2014 | Faccin | ..... 297/411.38 |
| 2001/0020799 A1 | * | 9/2001 | Bullesbach et al. | ..... 297/411.38 |
| 2005/0242649 A1 | * | 11/2005 | Himmelhuber et al. | . 297/411.38 |
| 2006/0138845 A1 | * | 6/2006 | Omori | ..... 297/411.38 |

(Continued)

FOREIGN PATENT DOCUMENTS

DE    692 17 729    7/1997
DE    198 40 808    3/2000

(Continued)

*Primary Examiner* — David E Allred
*Assistant Examiner* — Alexander Harrison
(74) *Attorney, Agent, or Firm* — Henry M. Feiereisen LLC

(57) ABSTRACT

An adjustment apparatus for swinging a comfort element in relation to a load-bearing structure about a pivot axis from a normal position to a pivoted position includes a locking device having a centrifugal force pendulum, a spring element, and a locking pin movable in opposition to a spring force of the spring element in parallel relationship to the pivot axis from a locked position in which the centrifugal force pendulum acts on the locking pin to seek engagement to a released position. The locking pin interacts with the comfort element in such a way that a pivoting of the comfort element from the normal position causes the locking pin to disengage from the locked position.

13 Claims, 4 Drawing Sheets

(56) References Cited

U.S. PATENT DOCUMENTS

2009/0309407 A1* 12/2009 Saito et al. ............... 297/411.32
2010/0253126 A1* 10/2010 Dillinger et al. ......... 297/411.38
2012/0261970 A1* 10/2012 Girbinger et al. ........ 297/411.38

FOREIGN PATENT DOCUMENTS

| | | |
|---|---|---|
| DE | 102 06 095 | 8/2003 |
| DE | 102005060196 | 12/2006 |
| DE | 102009023712 | 1/2011 |

* cited by examiner

ADJUSTMENT APPARATUS FOR A SWINGABLE COMFORT ELEMENT OF A MOTOR VEHICLE

CROSS-REFERENCES TO RELATED APPLICATIONS

This application claims the priority of German Patent Application, Serial No. 10 2012 016 884.5, filed Aug. 24, 2012, pursuant to 35 U.S.C. 119(a)-(d), the disclosure of which is incorporated herein by reference in its entirety as if fully set forth herein.

BACKGROUND OF THE INVENTION

The present invention relates to an adjustment apparatus for a swingable comfort element, such as an armrest, of a motor vehicle.

The following discussion of related art is provided to assist the reader in understanding the advantages of the invention, and is not to be construed as an admission that this related art is prior art to this invention.

The provision of an armrest for a motor vehicle, arranged for example as center armrest between both front seats with subjacent storage compartment is generally known. The armrest is hereby swingable from a normal position, in which the storage compartment is inaccessible, to a pivoted position in which access to the storage compartment is cleared. To meet motor vehicle safety standards (FMVSS201) established by the National Highway Traffic Safety Administration (NHTSA) with respect to height-adjustable and length-adjustable armrests, the armrests should be freely suspended or additionally locked in the event a subjacent storage option is made available.

It would be desirable and advantageous to provide an improved adjustment apparatus to obviate prior art shortcomings.

SUMMARY OF THE INVENTION

According to one aspect of the present invention, an adjustment apparatus for swinging a comfort element in relation to a load-bearing structure about a pivot axis from a normal position to a pivoted position includes a locking device having a centrifugal force pendulum, a spring element, and a locking pin movable in opposition to a spring force of the spring element in parallel relationship to the pivot axis from a locked position, in which the centrifugal force pendulum acts on the locking pin to seek engagement, to a released position, with the locking pin interacting with the comfort element in such a way that a pivoting of the comfort element from the normal position causes the locking pin to disengage from the locked position.

An adjustment apparatus according to the present invention is not only compact in structure and mountable in the area of the load-bearing structure invisible to a user but it can also be realized as shared component that can be used in different vehicle contexts and in different vehicle models. In addition, an adjustment apparatus according to the present invention affords also the benefit of a haptic feedback that can be felt as a result of a momentary increase force when the comfort element, e.g. the armrest, is swung from the normal position to thereby move the spring-biased locking pin in opposition to the spring force of the spring element. This haptic feedback is also experienced when the comfort element or armrest is swung from the pivoted position back to the normal position. The presence of such a haptic feedback indicates to an operator that the locking of the comfort element or armrest is active.

The motor vehicle safety standard (FMVSS 201) established by the National Highway Traffic Safety Administration (NHTSA) is also complied with so that in the event of a head-on impulse or rear-end impulse caused by an accident such as a crash or rollover, the locking pin is locked by the centrifugal force pendulum, i.e. a shift of the locking pin is no longer possible and as a result the comfort element or armrest can no longer be swung open since a swinging motion is inhibited by the thus-locked locking pin.

According to another advantageous feature of the present invention, the comfort element can be configured to have an effective surface area which interacts with a comfort-element-proximal end face of the locking pin to establish an interaction between the comfort element and the locking pin. Advantageously, the comfort-element-proximal end face of the locking pin can have a dome-shaped configuration. Such a dome-shaped end face permits realization of a comfortable operating kinematics.

According to another advantageous feature of the present invention, the effective surface area can be configured as a control edge or cam surface. Advantageously, the cam surface can be defined as a tangential surface area of the dome-shaped end face of the locking pin. The force pattern to provide haptic feedback can be adjusted in accordance with the inclination of the cam surface.

According to another advantageous feature of the present invention, the comfort element can be supported in the pivot axis by at least one load-bearing arm or pivot lever having a cam portion which includes the effective surface area.

According to another advantageous feature of the present invention, the locking pin can have a hollow-cylindrical configuration for accommodating the spring element, with the spring element maintaining the locking pin under tension, when the locking pin assumes the locked position. In this way, the adjustment apparatus according to the invention becomes particularly compact.

According to another advantageous feature of the present invention, the locking pin has an outer surface area which can be provided with a radial circumferential flange resting against a stop of the locking device, when the locking pin assumes the locked position. As a result, the locked position of the locking pin can be defined in a simple manner.

According to another advantageous feature of the present invention, the centrifugal force pendulum can have an engagement member which bears upon the flange of the locking pin for locking the locking pin while inhibiting an axial displacement of the locking pin. This, the flange assists the locking action by the centrifugal force pendulum.

When the pivot axis of the comfort element extends in transverse direction of the vehicle, it can be advantageous when the centrifugal force pendulum defines a swing plane which extends perpendicular to the pivot axis of the comfort element. In this way, the centrifugal force pendulum is able to react to rear or front impulses caused by an accident, such as a crash or rollover.

According to another advantageous feature of the present invention, the centrifugal force pendulum can include a pendulum arm which is swingable about a rotation axis and a pendulum mass which includes the engagement member, with the rotation axis extending in parallel relation to the pivot axis of the comfort element.

To ensure a locking of the locking pin in the event of a head-on collision or rear-end collision, it can be advantageous to provide the locking device with two centrifugal force pendulums which are arranged in a swing plane which extends in perpendicular relation to the pivot axis of the comfort element. Advantageously, the engagement members of the two centrifugal force pendulums bear upon a flange of the locking pin in diametrically opposite relationship.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
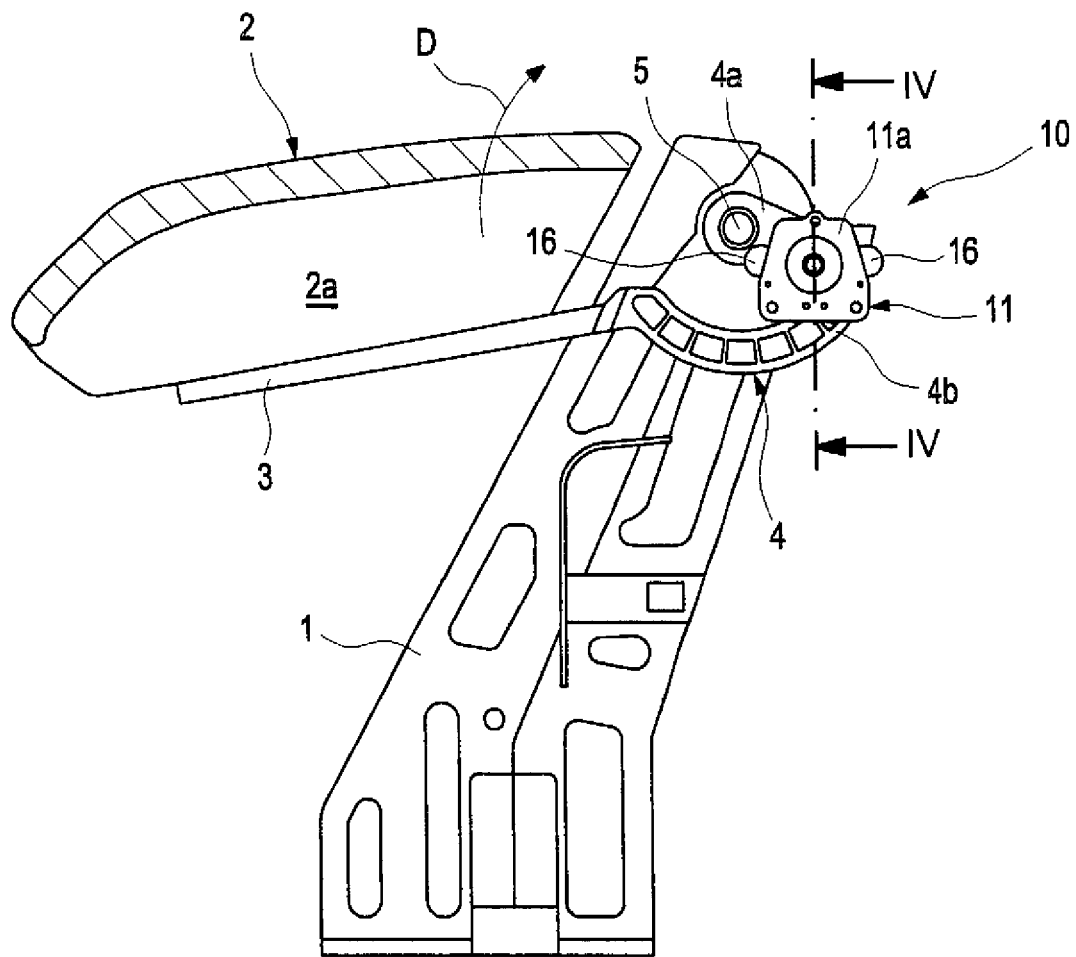
FIG. 1 is a schematic perspective side view of an adjustment apparatus according to the present invention for a swingable comfort element, configured as an armrest by way of example, of a vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic perspective side view of an adjustment apparatus according to the present invention for a swingable comfort element represented here by way of example by an armrest, generally designated by reference numeral 2. The armrest 2 includes an arm support 2a configured as center armrest for the front seats of a vehicle, in particular a motor vehicle. Lying underneath the armrest 2 is a storage compartment (not shown in FIG. 1) which is closed by the armrest 2. As can be seen from FIG. 1, the armrest 2 includes a load-bearing plate 3 for support of the arm support 2a.

As shown in FIG. 1, the load-bearing plate 3 is swingably connected to a load-bearing structure 1 via two support arms 4 disposed in parallel relation. Each of the support arms 4 includes a rotary lever 4a and a circular member 4b which connects the rotary lever 4a to the load-bearing plate 3. The two support arms 4 are swingably mounted about pivot axes 5 of the rotary levers 4a, supported by the load-bearing structure 1, so that the armrest 2 can be pivoted in a swing direction, as indicated by arrow D, from a normal position, in which the armrest 2 closes the storage compartment, to a pivoted position in which the storage compartment underneath the armrest 2 is opened and accessible by a vehicle occupant.

FIG. 1 further shows the provision of a locking device, generally designated by reference numeral 10 and connected to the load-bearing structure 1 in the transition zone from the circular member 4b to the rotary lever 4a.

Figure 2:
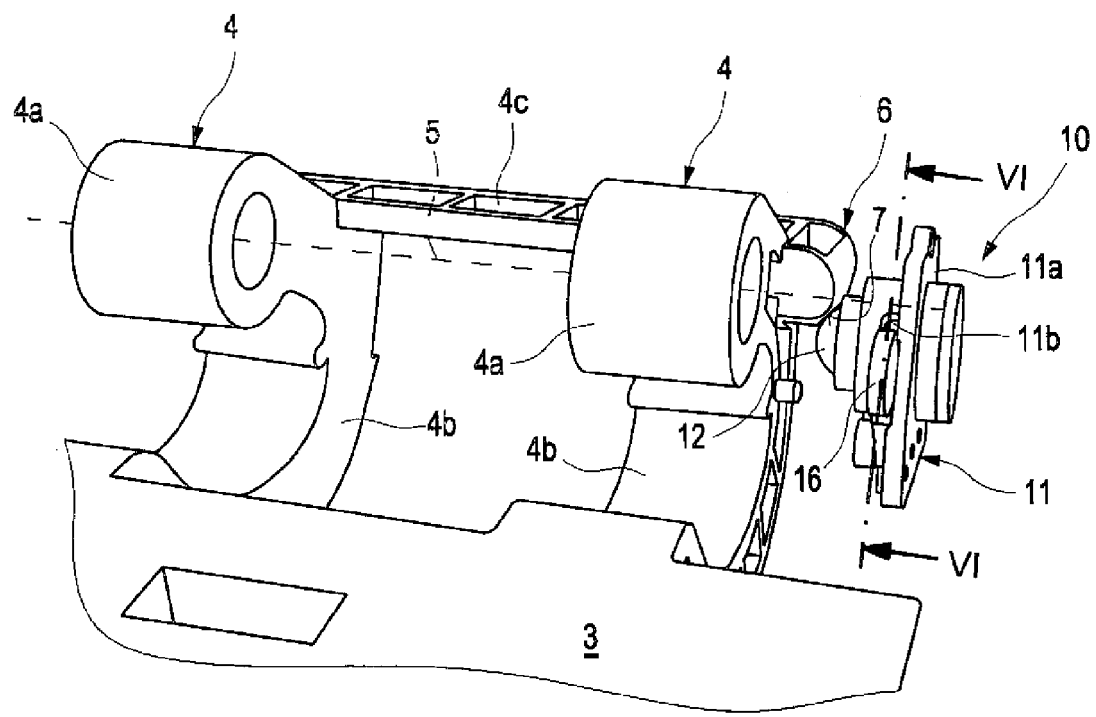
FIG. 2 is a schematic perspective top view of the adjustment apparatus of FIG. 1.

FIG. 2 shows a schematic perspective top view of the adjustment apparatus of FIG. 1 to illustrate the load-bearing plate 3 with the support arms 4 and the locking device 10. For ease of illustration, the load-bearing structure 1 is not shown here. As can be seen from FIG. 2, the two support arms 4 are connected to one another by a cross member 4c in the transition zone from the circular member 4b to the rotary lever 4a.

Figure 3:
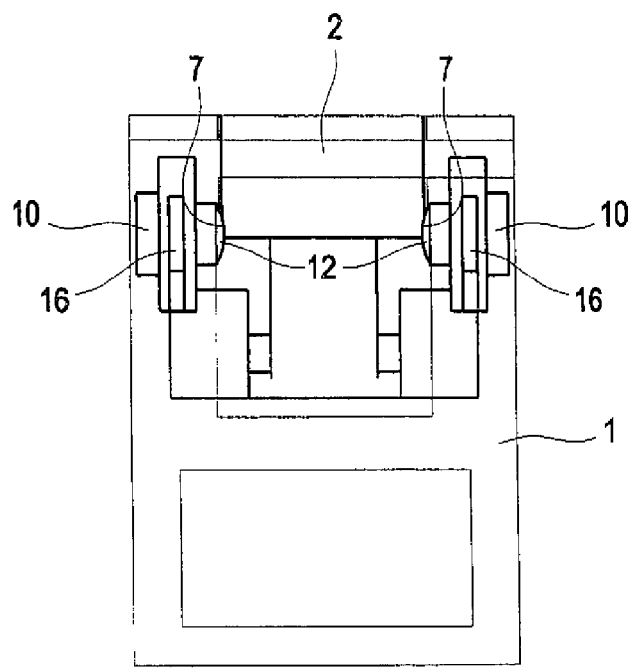
FIG. 3 is a schematic rear view of the adjustment apparatus of FIG. 1.

The locking device 10 has a cylindrical housing 11 which accommodates a locking pin 12 and two centrifugal force pendulums 16 and which has a radial mounting flange 11a to mount the locking device 10 to the load-bearing structure 1. As shown in FIG. 3 by way of a schematic rear view upon the load-bearing structure 1 and the armrest 2, the adjustment apparatus has locking devices 10, respectively arranged on both sides of the support arms 4. Structure and function of the locking devices 10 and their interaction with the armrest 2 will now be described in greater detail with reference to FIGS. 4 to 7.

Figure 4:
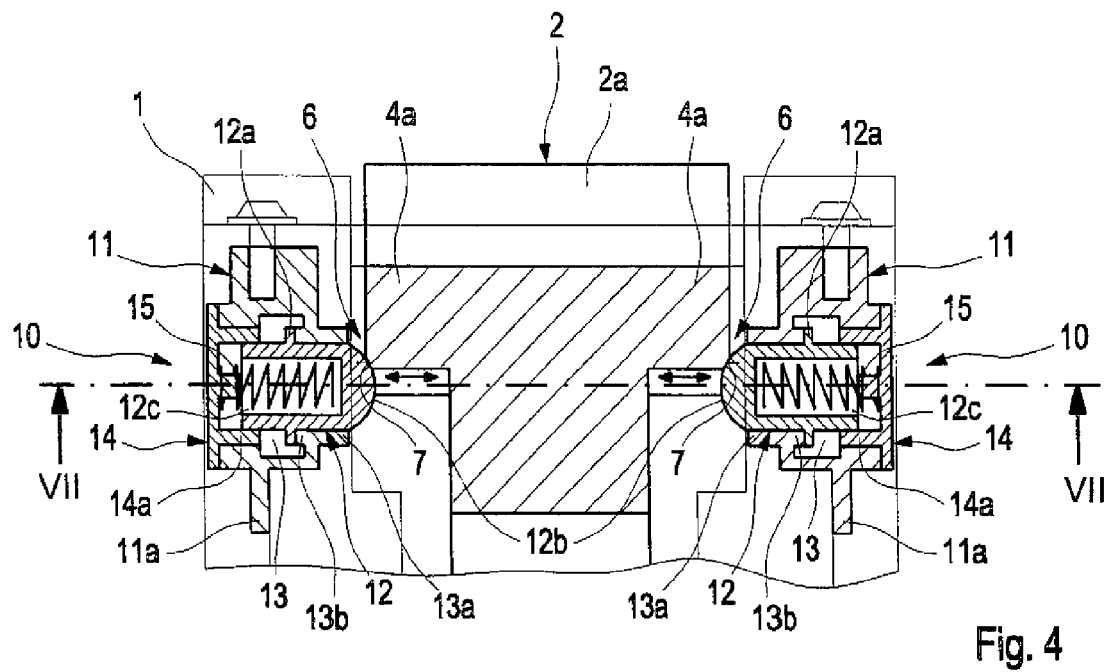
FIG. 4 is a sectional rear view of the adjustment apparatus, taken along the line IV-IV in FIG. 1.
Figure 5:
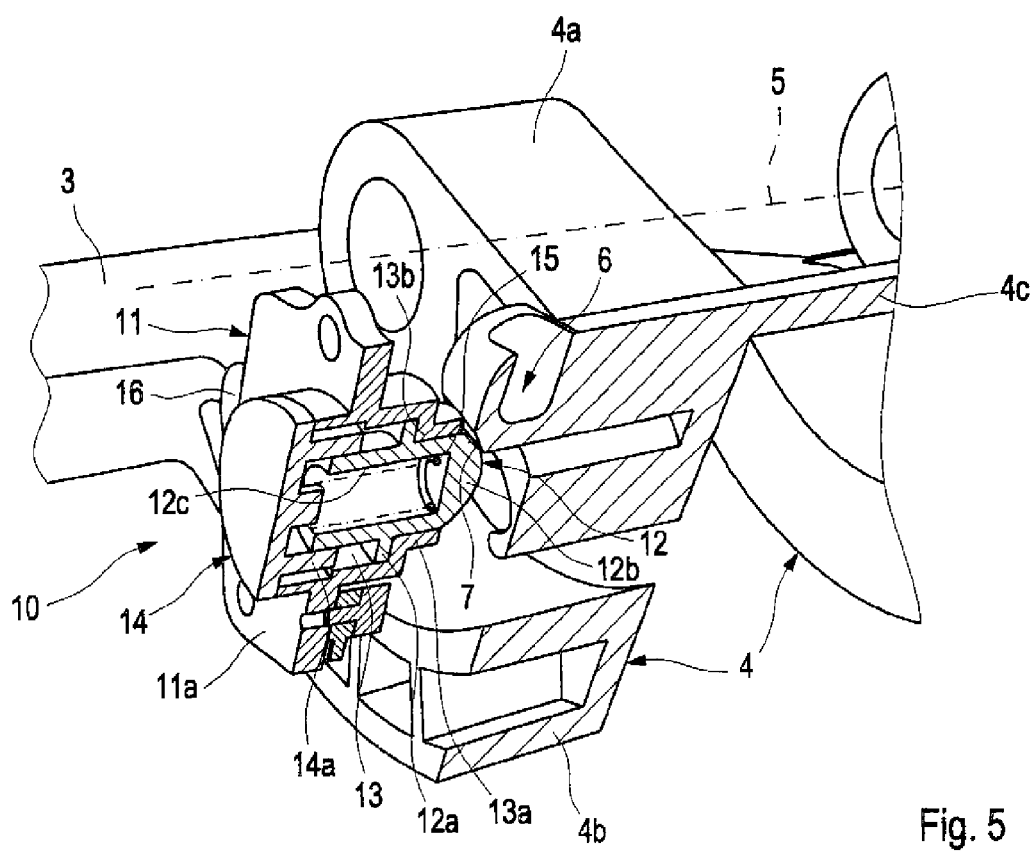
FIG. 5 is a perspective sectional view of the adjustment apparatus, taken along the line IV-IV in FIG. 1.

According to the sectional views of FIGS. 4 and 5, the housing 11 of the locking device 10 is formed with a contoured through opening 13 in parallel relation to the pivot axis 5 of the armrest 2 for movably receiving the locking pin 12. The locking pin 12 is supported in the through opening 13 in such a way that the locking pin 12 is able to move between a locked position, in which the locking pin 12 is locked in place by one of the centrifugal force pendulums 16, and a released position, in which the locking pin 12 cannot be locked in place by either one of the centrifugal force pendulums 16.

The through opening 13 of the locking device 10 ends on the side of the support arm 4 with a flanged member 13a which has an inner diameter in correspondence to the outer diameter of the locking pin 12. On the opposite side of the locking device 10, the through opening 13 is closed by a lid element 14 having a circular-ring-shaped portion 14a which has an outer diameter in correspondence to the inner diameter of the through opening 13, and an inner diameter in correspondence with the outer diameter of the locking pin 12. As a result, the locking device 10 can be assembled by pushing the lid element 14 into the through opening 13.

The locking pin 12 is thus movably guided in the flanged member 13a of the through opening 13 and in the circular-ring-shaped portion 14a of the lid element 14, with a circular-ring-shaped flange 12a being provided on the outer surface area of the locking pin 12. In the locked position of the locking pin 12, as shown in FIGS. 4 and 5, the flange 12a bears upon a stop 13a in the form of a shoulder of the flanged member 13a. In this locked position, the locking pin 12 is maintained under tension by a spring element 15 configured as coil spring. The spring element 15 is received in a blind bore 12c of the locking pin 12 and thus has one end supported on a support-arm-proximal end face 12b of the locking pin 12 and by the lid element 14, The end face 12b has a dome-shaped outer surface, i.e. the end face 12b has a substantially convex surface area.

The locking pin 12 can thus be moved away from the locked position, shown in FIGS. 4 and 5, in opposition to the spring force of the spring element 15 in the direction of the lid element 14 until the flange 12a of the locking pin 12 impacts the end face of the circular portion 14a of the lid element 14, representing the released position. A return of the locking pin 12 back to the initial position, i.e. locked position, can be realized by the spring force of the spring element 15.

The two support arms 4 of the load-bearing plate 3 of the armrest 2 are configured with a cam portion 6 having a cam surface 7 as effective surface area to bear in the normal position of the armrest 2 essentially against the dome-shaped end face 12b of the locking pin 12. The cam surface 7 is hereby oriented as a tangential area lying on the dome-shaped surface of the end face 12b of the locking pin 12.

Instead of a cam surface as effective surface area between the cam portion 6 and the locking pin 12, it is, of course, also conceivable to use a control edge (not shown). Such a control edge would also bear upon the dome-shaped surface of the end face 12b of the locking pin 12, when the armrest 2 assumes the normal position.

When the armrest 2 is swung about the pivot axis 5 from the normal position in swing direction D to a pivoted position, the cam surface 7 interacts with the dome-shaped end face 12b of the locking pin 12 in such a way that a force, generated in movement direction of the locking pin 12, causes the locking pin 12 to move in the direction of the lid element 14 in opposition to the spring force of the spring element 15. As the spring force of the spring element 15 opposes the displacement of the locking pin 12, a momentary increase in force is encountered which can be noticed by a person as haptic feedback. Likewise, when returning the armrest 2, the spring force generated by the tensed spring element 15 causes the locking pin 12 to be pushed back to the locked position, thereby producing again a haptic feedback.

When the armrest 2 assumes its normal position, one of the two centrifugal force pendulums 16 prevents a disengagement of the locking pin 12 from the locked position, when this centrifugal force pendulum 16 is deflected from its rest position as a result of a head-on or rear-end impact.

Figure 6:
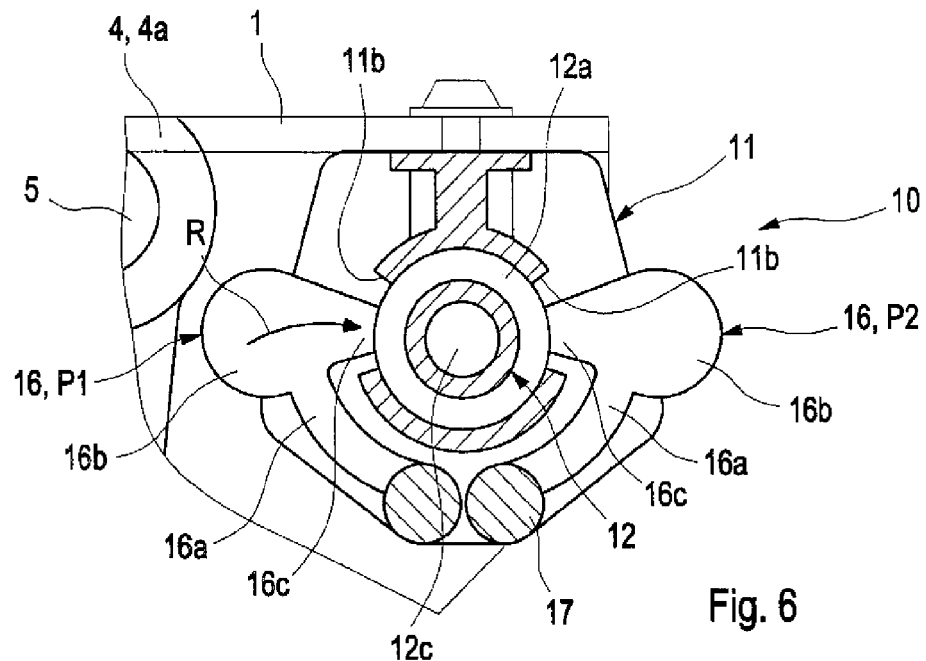
FIG. 6 is a sectional view of the adjustment apparatus, taken along the line VI-VI in FIG. 2.

FIG. 6 shows a sectional view of the adjustment apparatus, taken along the line VI-VI in FIG. 2, and depicts in greater detail the structure of the locking device 10 with the two centrifugal force pendulums 16, with the interaction of the centrifugal force pendulums 16 with the locking pin 12 in the event of an impact being described with reference to FIG. 7 which is a sectional view of the adjustment apparatus, taken along the line VII-VII in FIG. 4. For ease of understanding, the centrifugal force pendulums 16 are differentiated here through additional designation with reference signs P1 and P2.

Each of the two centrifugal force pendulums 16 has a pendulum arm 16a and a pendulum mass 16b, with the pendulum arm 16a being mounted to a shaft 17 for rotation about a rotation axis which is also oriented in parallel relationship to the pivot axis 5 of the armrest 2. The pendulum mass 16b has a plate-shaped configuration with substantial elliptic contour and has an engagement member 16c in the direction of the locking pin 12. When the pendulum mass 16b of, e.g. the centrifugal force pendulum P1 is moved in the direction of arrow R of the locking pin 12, the engagement member 16c swings into a housing opening 11b of the housing 11 of the locking device 10 until the end face of the engagement member 16c rests upon the outer surface area of the locking pin 12 and upon an end face of the flange 12a. This is shown in FIG. 7. As the flange 12a bears upon the engagement member 16c of the pendulum mass 16b, the locking pin 12 is prevented for shifting. The dashed line indicates in FIG. 7 the pendulum mass 16b of the centrifugal force pendulum P1 in a position when not pivoted.

When swinging the armrest 2 open, the interaction of the cam surface 7 with the dome-shaped end face 12b of the locking pin 12 moves the locking pin 12 out of its locked position so that the engagement member 16c of the pendulum mass 16b of the centrifugal force pendulum 16 impacts the peripheral surface area of the flange 12a of the locking pin 12 and thus is prevented from engaging behind the locking pin 12. The engagement member 16c is thus unable to move the locking pin 12 in this released position.

Both centrifugal force pendulums 16 (P1 and P2) are arranged in the locking device 10 in such a way that the two engagement members 16c of both pendulum masses 16a oppose one another diametrically, as this is shown in FIG. 6.

Figure 7:
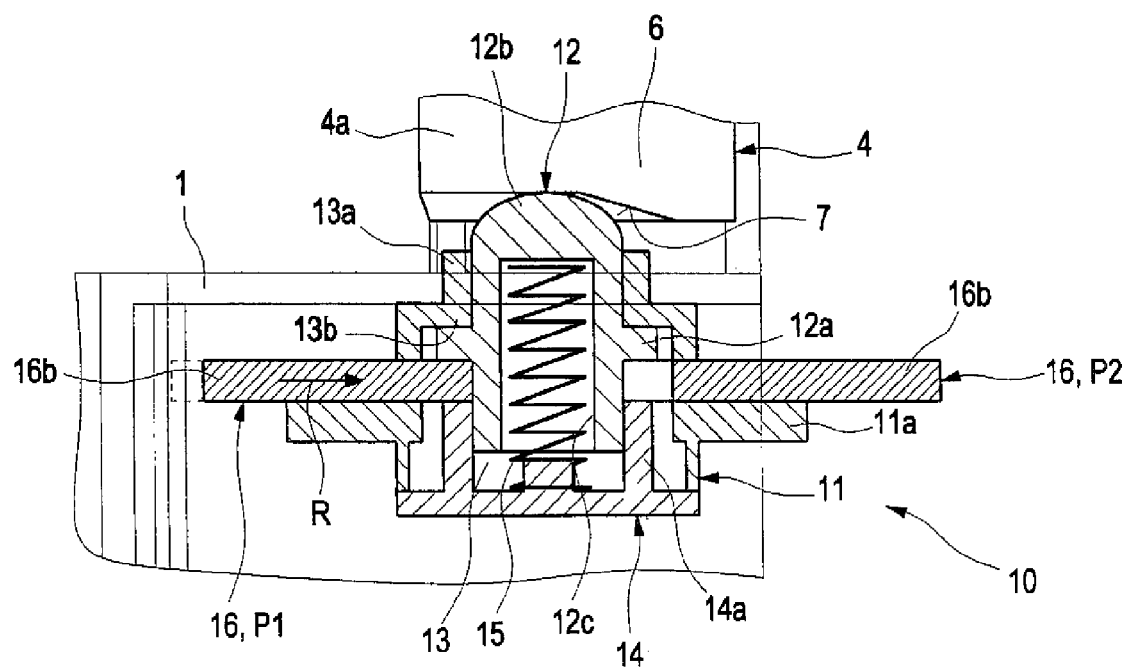
FIG. 7 is a sectional view of the adjustment apparatus, taken along the line VII-VII in FIG. 4.

The centrifugal force pendulum P1, shown in FIGS. 6 and 7, is arranged in travel direction of the vehicle so as to move with its pendulum mass 16b in the direction of the locking pin 12 in the event of a rear-end collision, until the engagement member 16c thereof bears upon the outer surface area of the locking pin 12 and upon the flange 12a thereof. The centrifugal force pendulum P2, on the other hand, does not pivot in the direction of the locking pin 12 in the event of a rear-end impact. These conditions are reversed in the event of a head-on impact, i.e. the centrifugal force pendulum P2 swings in the direction of the locking pin 12 so that its engagement member 16b rests upon the outer surface area of the locking pin 12 and upon the flange 12a thereof to thereby prevent a displacement of the locking pin 12.

As a displacement of the locking pin 12 is prevented in the event of a rear-end impact or head-on impact, the armrest 2 is also prevented from swinging from its normal position to the pivoted position in an uncontrolled manner. Such a movement is blocked by the cam surface 7 bearing upon the dome-shaped end face 12b of the locking pin 12.

An adjustment apparatus according to the present invention for an armrest can thus be used as a cover for a subjacent storage compartment and is in compliance with the motor vehicle safety standard (FMVSS 201) demanded in the USA by the National Highway Traffic Safety Administration (NHTSA) and requiring a locking of height-adjustable and length-adjustable armrests.

A further benefit of an adjustment apparatus according to the present invention resides in the integration, e.g. by a screwed connection, of the locking device 10 in the mechanics of the armrest so as to be invisible to a vehicle occupant so that the look of the armrest is not adversely affected.

Although the afore-described example of an adjustment apparatus according to the present invention involves the integration of two locking devices 10 in the armrest 2 to attain a symmetric force introduction, it is, of course, also conceivable to equip the armrest 2 with only one locking device 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An adjustment apparatus in combination with a comfort element of a vehicle for swinging the comfort element in relation to a load-bearing structure about a pivot axis from a normal position to a pivoted position, said adjustment apparatus comprising:

a locking device having a centrifugal force pendulum, supported on the comfort element;

a spring element; and a locking pin movably supported on the comfort element and movable in opposition to a spring force of the spring element along an axis parallel to the pivot axis from a locked position to a released position, said locking pin interacting with the comfort element in such a way that a pivoting of the comfort element from the normal position causes the locking pin to disengage from the locked position, wherein the locking pin has an outer surface area provided with a radial circumferential flange, and wherein the centrifugal force pendulum has an engagement member which bears upon the flange of the locking pin for locking the locking pin by preventing an axial displacement of the locking pin.

2. The adjustment apparatus of claim 1, wherein the comfort element is an armrest.

3. The adjustment apparatus of claim 1, wherein the comfort element is configured to have an effective surface area which interacts with a comfort-element-proximal end face of the locking pin to establish an interaction between the comfort element and the locking pin.

4. The adjustment apparatus of claim 3, wherein the comfort-element-proximal end face of the locking pin has a dome-shaped configuration.

5. The adjustment apparatus of claim 3, wherein the effective surface area is a control edge or cam surface.

6. The adjustment apparatus of claim 5, wherein the cam surface is defined as a tangential surface area that is tangent to the dome-shaped end face of the locking pin.

7. The adjustment apparatus of claim 3, wherein the comfort element is supported in the pivot axis by at least one load-bearing arm having a cam portion which includes the effective surface area.

8. The adjustment apparatus of claim 1, wherein the locking pin has a hollow-cylindrical configuration for receiving the spring element, said spring element maintaining the locking pin under tension, when the locking pin assumes the locked position.

9. The adjustment apparatus of claim 1, wherein the radial circumferential flange rests against a stop of the locking device, when the locking pin assumes the locked position.

10. The adjustment apparatus of claim 1, wherein the centrifugal force pendulum is defined by a swing plane extending perpendicular to the pivot axis of the comfort element.

11. The adjustment apparatus of claim 9, wherein the centrifugal force pendulum includes a pendulum arm swingable about a rotation axis and a pendulum mass which includes the engagement member, said rotation axis extending in parallel relation to the pivot axis of the comfort element.

12. The adjustment apparatus of claim 1, wherein the locking device comprises two centrifugal force pendulums, including said centrifugal force pendulum, said two centrifugal force pendulums arranged in a swing plane which extends in perpendicular relation to the pivot axis of the comfort element.

13. The adjustment apparatus of claim 12, wherein the engagement member of one of the two centrifugal force pendulums and the engagement member of the other one of the two centrifugal force pendulums bear upon a flange of the locking pin in diametrically opposite relationship.

* * * * *